US010372209B2

(12) United States Patent
Cheng et al.

(10) Patent No.: US 10,372,209 B2
(45) Date of Patent: Aug. 6, 2019

(54) EYE TRACKING ENABLING 3D VIEWING

(71) Applicant: Nintendo Co., Ltd., Kyoto (JP)

(72) Inventors: Howard Cheng, Sammamish, WA (US); William C. Newman, Jr., Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/144,635

(22) Filed: Sep. 27, 2018

(65) Prior Publication Data
US 2019/0025913 A1    Jan. 24, 2019

Related U.S. Application Data

(63) Continuation of application No. 14/794,335, filed on Jul. 8, 2015, now Pat. No. 10,114,455, which is a continuation of application No. 14/197,831, filed on Mar. 5, 2014, now Pat. No. 9,098,112, which is a continuation of application No. 12/879,909, filed on Sep. 10, 2010, now Pat. No. 8,704,879.

(Continued)

(51) Int. Cl.
| | |
|---|---|
| *H04N 7/18* | (2006.01) |
| *H04N 9/47* | (2006.01) |
| *G06F 3/01* | (2006.01) |
| *H04N 13/279* | (2018.01) |
| *H04N 13/366* | (2018.01) |
| *G06T 15/00* | (2011.01) |

(52) U.S. Cl.
CPC .............. *G06F 3/013* (2013.01); *G06T 15/00* (2013.01); *H04N 13/279* (2018.05); *H04N 13/366* (2018.05)

(58) Field of Classification Search
None
See application file for complete search history.

(56) References Cited

U.S. PATENT DOCUMENTS

| | | | |
|---|---|---|---|
| 4,558,359 | A | 12/1985 | Kuperman et al. |
| 4,870,600 | A | 9/1989 | Hiraoka |

(Continued)

FOREIGN PATENT DOCUMENTS

| | | |
|---|---|---|
| JP | 10-214344 | 8/1998 |
| JP | 2002-366271 | 12/2002 |

(Continued)

OTHER PUBLICATIONS

IBVA Technologies Inc., The Gallery, http://www.ibva.com/Gallery/Gallery.htm (1991-2003).

(Continued)

*Primary Examiner* — Talha M Nawaz
(74) *Attorney, Agent, or Firm* — Nixon & Vanderhye P.C.

(57) ABSTRACT

The exemplary illustrative non-limiting technology herein enables 3D viewing on conventional 2D displays such as home television sets by tracking a person's viewpoint. Detecting a player's viewpoint movement to change the viewing of the displayed object gives the illusion that the object is physically present in three-dimensional space. Viewpoint movement detection can provide collision-related game logic benefits such as allowing a player to dodge projectiles, giving a game character an ability to "see" the player when not behind line-of-sight obstacles, and other advantages.

20 Claims, 13 Drawing Sheets

Related U.S. Application Data

(60) Provisional application No. 61/378,921, filed on Aug. 31, 2010.

(56) References Cited

U.S. PATENT DOCUMENTS

| | | | |
|---|---|---|---|
| 4,875,034 A | 10/1989 | Brokenshire | |
| 4,984,179 A | 1/1991 | Waldern | |
| 5,287,437 A | 2/1994 | Deering | |
| 5,379,369 A | 1/1995 | Komma et al. | |
| 5,394,202 A | 2/1995 | Deering | |
| 5,446,834 A | 8/1995 | Deering | |
| 5,495,576 A | 2/1996 | Ritchey | |
| 5,594,843 A | 1/1997 | O'Neill | |
| 5,682,171 A | 10/1997 | Yokoi | |
| 5,740,337 A | 4/1998 | Okino et al. | |
| 5,764,236 A | 6/1998 | Tanaka et al. | |
| 5,801,705 A | 9/1998 | Kato et al. | |
| 6,011,581 A | 1/2000 | Swift et al. | |
| 6,084,979 A | 7/2000 | Kanade et al. | |
| 6,133,945 A | 10/2000 | Stuettler | |
| 6,151,062 A | 11/2000 | Inoguchi et al. | |
| 6,160,527 A | 12/2000 | Morishima et al. | |
| 6,198,484 B1 | 3/2001 | Kameyama | |
| 6,175,379 B1 | 6/2001 | Uomori et al. | |
| 6,262,743 B1 | 7/2001 | Alio | |
| 6,268,880 B1 | 7/2001 | Uomori et al. | |
| 6,295,062 B1 | 9/2001 | Tettington | |
| 6,320,978 B1 | 11/2001 | Szeliski et al. | |
| 6,323,999 B1 | 11/2001 | Ueda | |
| 6,324,347 B1 | 11/2001 | Bacs, Jr. et al. | |
| 6,348,918 B1 | 2/2002 | Szeliski et al. | |
| 6,353,457 B2 | 3/2002 | Uomori et al. | |
| 6,366,370 B1 | 4/2002 | Holzbach et al. | |
| 6,429,867 B1* | 8/2002 | Deering | G06T 9/00 345/423 |
| 6,438,260 B1 | 8/2002 | Robinson | |
| 6,445,807 B1 | 9/2002 | Katayama et al. | |
| 6,483,533 B1 | 11/2002 | Hall, Jr. | |
| 6,501,468 B1 | 12/2002 | Kaji | |
| 6,515,662 B1 | 2/2003 | Garland | |
| 6,516,087 B1 | 2/2003 | Camus | |
| 6,532,008 B1 | 3/2003 | Guralnick | |
| 6,549,650 B1 | 4/2003 | Ishikawa et al. | |
| 6,570,566 B1 | 5/2003 | Yoshigahara | |
| 6,606,406 B1 | 8/2003 | Zhang et al. | |
| 6,630,931 B1 | 10/2003 | Trika et al. | |
| 6,639,596 B1 | 10/2003 | Shum et al. | |
| 6,639,631 B1 | 10/2003 | Hall, Jr. et al. | |
| 6,677,939 B2 | 1/2004 | Uchiyama | |
| 6,687,399 B1 | 2/2004 | Chuang et al. | |
| 6,701,005 B1 | 3/2004 | Nichani | |
| 6,734,884 B1 | 5/2004 | Berry | G06T 19/003 715/848 |
| 6,798,406 B1 | 9/2004 | Jones et al. | |
| 6,816,158 B1 | 11/2004 | Lemelson et al. | |
| 6,862,035 B2 | 3/2005 | Jeong et al. | |
| 6,890,262 B2 | 5/2005 | Oishi et al. | |
| 6,911,975 B2 | 6/2005 | Iizuka et al. | |
| 6,915,008 B2 | 7/2005 | Barman et al. | |
| 6,924,799 B2 | 8/2005 | Lefebvre et al. | |
| 6,956,964 B2 | 10/2005 | Lee et al. | |
| 6,963,431 B2 | 11/2005 | Holzbach et al. | |
| 6,985,162 B1 | 1/2006 | Schinnerer et al. | |
| 6,985,168 B2 | 1/2006 | Swift et al. | |
| 6,996,267 B2 | 2/2006 | Tabata | |
| 7,006,952 B1 | 2/2006 | Matsumoto et al. | |
| 7,091,991 B2 | 3/2006 | Palm et al. | |
| 7,034,819 B2 | 4/2006 | Lee et al. | |
| 7,064,754 B2 | 6/2006 | Izuka et al. | |
| 7,091,931 B2 | 8/2006 | Yoon | |
| 7,190,518 B1* | 3/2007 | Kleinberger | G02B 27/0093 359/465 |
| 7,626,569 B2 | 12/2009 | Lanier | G06F 1/1601 345/156 |
| 7,805,017 B1 | 9/2010 | Basso et al. | |
| 7,874,917 B2 | 1/2011 | Marks et al. | |
| 2002/0024517 A1 | 2/2002 | Yamaguchi et al. | |
| 2002/0154214 A1 | 10/2002 | Scallie et al. | |
| 2003/0020709 A1 | 1/2003 | Naegle et al. | |
| 2003/0103062 A1 | 6/2003 | Lee et al. | |
| 2003/0179198 A1 | 9/2003 | Uchiyama | |
| 2004/0046736 A1 | 3/2004 | Pryor et al. | |
| 2004/0104935 A1* | 6/2004 | Williamson | G06F 3/012 715/757 |
| 2004/0135744 A1 | 7/2004 | Bimber et al. | |
| 2004/0212612 A1 | 10/2004 | Epstein et al. | |
| 2005/0030308 A1 | 2/2005 | Takaki | |
| 2005/0035963 A1 | 2/2005 | Iizuka et al. | |
| 2005/0053274 A1* | 3/2005 | Mayer | G03B 21/18 382/154 |
| 2005/0219240 A1 | 10/2005 | Vesely et al. | |
| 2005/0264558 A1 | 12/2005 | Vesely et al. | |
| 2005/0264559 A1 | 12/2005 | Vesely et al. | |
| 2005/0285854 A1 | 12/2005 | Morita et al. | |
| 2006/0126926 A1 | 6/2006 | Vesely et al. | |
| 2006/0164411 A1 | 7/2006 | Lee | |
| 2006/0177123 A1 | 8/2006 | Ha | |
| 2006/0177124 A1 | 8/2006 | Ha | |
| 2006/0192776 A1 | 8/2006 | Nomura et al. | |
| 2006/0192780 A1 | 8/2006 | Lantin | |
| 2006/0204075 A1 | 9/2006 | Mashitani et al. | |
| 2006/0210146 A1 | 9/2006 | Gu | |
| 2006/0221071 A1 | 10/2006 | Vesely et al. | |
| 2006/0232584 A1 | 10/2006 | Utsugi et al. | |
| 2006/0250392 A1 | 11/2006 | Vesely et al. | |
| 2009/0278764 A1 | 11/2009 | Kuwahara et al. | |
| 2010/0026794 A1 | 2/2010 | Chang | |
| 2010/0110069 A1* | 5/2010 | Yuan | G06T 15/20 345/419 |
| 2010/0281439 A1 | 11/2010 | Markovic et al. | |
| 2011/0090217 A1 | 4/2011 | Mashitani | H04N 13/0296 345/419 |
| 2011/0183301 A1 | 7/2011 | Turner | G09B 9/302 434/43 |
| 2012/0056987 A1 | 3/2012 | Fedoroff | |
| 2012/0194656 A1* | 8/2012 | Killian | H04N 13/341 348/56 |
| 2013/0120362 A1 | 5/2013 | Harris | H04N 13/0459 345/419 |
| 2013/0203492 A1* | 8/2013 | Yum | A63F 13/06 463/31 |
| 2013/0267317 A1* | 10/2013 | Aoki | G07F 17/3206 463/32 |
| 2014/0146394 A1* | 5/2014 | Tout | G09B 9/307 359/630 |

FOREIGN PATENT DOCUMENTS

| | | |
|---|---|---|
| JP | 2004-313778 | 11/2004 |
| JP | 2009-519553 A | 5/2009 |
| JP | 2009-134235 | 6/2009 |
| WO | 2007/070738 A2 | 6/2007 |

OTHER PUBLICATIONS

Trackir by NaturalPoint, Trackir 4: Pro, http://www.naturalpoint.com/trackir/02-products/product-TrackIR-4-PRO-html (Aug. 2005).

Kosak, D., "Mind-Numbing New Interface Technologies," http://www.gamespy.com/articles/585/584744p1.html (Feb. 1, 2005).

"Mind-Numbing New Interface Technologies, The 'Minority Report' Demo" http://www.gamespy.com/articles/585/584744p2.html (Feb. 1, 2005).

TTIVanguard, Crossover Technologies, Richard Marks, "Future Gaming Technologies and Interfaces," http://www.ttivanguard.com/conference/2006/crossover_agenda.html (Feb. 17, 2006).

Renaduin, V., Yalak, O., Tome, P., "Hybridization of MEMS and assisted GPS for Pedestrian Navigation," http://infoscience/epfl.ch/record/100277/files/IGM0207_Renaudin_WM.pdf, Inside GNSS, Jan./Feb. 2007.

(56) References Cited

OTHER PUBLICATIONS

Sun, C, Naghdy, F., Stirling, D., "Application of MML to Motor Skills Acquisition," http://www.xsens.com/images/stories/PDF/Application%20of%20MML%20to%20Motor%20Skills%20Acquisition.pdf, International Conference on Commputational Intelligence for Modelling, Control and Automation 2006.

Hub, A., Hartter, T., Ertl, T., "Interactive Tracking of Movable Objects for the Blind on the Basis of Environment Models and Perception-Oriented Object Recognition Methods," ASSETS'06, Portland, USA, Oct. 22-25, 2006.

Stiefmeier, T., Ogris, G., Junker, H., Lukowicz, P., Troster, G., Combining Motion Sensors and Ultrasonic Hands Tracking for Continuous Activity Recognition in a Maintenance Scenario, http://www.xsens.com/images/stories/PDF/Combining%20Motion%20Sensors%20and%20Ultrasonic%20Hands%20Tracking.pdf, Wearable Computing Lab, ETH Zürich, Switzerland & Institute for Computer Systems and Networks, UMIT, Innsbruck, Austria, 2006.

Moore, S., Macdougall, H., Gracies, J., Cohen, H., Ondo, W., "Long-term monitoring of gait in Parkinson's disease," http://www.xsens.com/images/stories/PDF/PD_gait_monitor.pdf, Elsewier, Science Direct, Gait & Posture, Sep. 2006.

Thies, S., Tresadern, P., Kenney, L., Howard, D., Goulermas, J., Smith, C., Rigby, J., "Comparison of linear accelerations from three measurement systems during 'reach & grasp'", http://personalpages.manchester.ac.uk/staff/Philip.Tresadern/papers/Thies_etal_MEP07.pdf, Centre for Rehabilitation and Human Performance Research, University of Salford, Salford, Manchester, UK, Oct. 2006.

Zhou, H., Hu, H., Tao, Y., "Inertial measurements of upper limb motion," International Federation for Medical and Biological Engineering, vol. 44, No. 6, 479-487, May 31, 2006.

Heinz, E., Kunze, K., Gruber, M., Bannach, D., Lukowicz, P., "Using Wearable Sensors for Real-time Recognition Tasks in Games of Martial Arts—An Initial Experiment," Institute for Computer Systems and Networks (CSN), UMIT—University of Health Systems, Medical Informatics and Technology, Hall in Tyrol, Austria, 2005.

Kunze, K., Barry, M., Heinz, E., Lukowicz, P., Majoe, D., Gutknecht, J., "Towards Recognizing Tai Chi—An Initial Experiment Using Wearable Sensors," Institute for Computer Systems and Networks (CSN), UMIT, Hall in Tyrol, Austria, 2005.

Pfau, T., Witte, T., Wilson, A., "A Method for deriving displacement data during cyclical movement using an inertial sensor," http://www.rvc.ac.uk/sml/people/documents/PfauJEB2005MT9validationfinal.pdf, The Journal of Experimental Biology 208, The Company of Biologists 2005, Apr. 25, 2005.

Zhou, H., Hu, H., "A Survey—Human Movement Tracking and Stroke Rehabilitation," Technical Report: CSM-420, ISSN 1744-8050, by Department of Computer Sciences, University of Essex, Dec. 8, 2004.

Monaghan, C., Veltink, P., Bultstra, G., Droog, E., Kotiadis, D., van Riel, W., "Control of Triceps Surae Stimulation based on shank orientation using a uniaxial gyroscope," http://www.xsens.com/images/stories/PDF/Control%20of%20Triceps%20Surae%20Stimulation%20based%20on%20shank%20orientation%20using%20a%20uniaxial%20gyroscope.pdf, 9th Annual Conference of the International FES Society, Sep. 2004.

Galvan-Duque, C., Mayagoitia-Hill, R., Wakil, F., "Biomechanics of Stair Climbing," http://www.xsens.com/images/stories/PDF/Biomechanics%20Biomechanics%20of%20Stair%20Climbing.pdf, Centre of Rehabilitation Engineering, King's College London, 2003.

Beauregard, S., "A Helmet-Mounted Pedestrian Dead Reckoning System," TZI Technologie-Zentrum Informatik, Universitat Bremen, 2006.

Goodvin, C.I., "The development of a three-dimensional spinal motion measurement system for clinical practice," http://www.xsens.com/images/stories/PDF/The%20development%20of%20a%20three-dimensional%20spinal%20motion%20measurement%20system%20for%20clinical%20practice.pdf, Department of Mechanical Engineering, University of Victoria, Nov. 2006.

Assalih, H., Cartwright, J., Chalencon, V., Davis, B., Durrant, A., Faraud, E., Figiel, F., Harber, D., Jiminez, M., Johnson, N., Lees, A., Long, P., Perez, J., Qiang, Z., Sawas, J., Sotzing, C., Petillot, Y., "Nessie II Autonomous Underwater Vehicle," http://www.xsens.com/images/stories/PDF/hw-nessie-journal.pdf, Heriot Watt University, 2007.

Wang, J., "Intelligent MEMS INS/GPS Integration for Land Vehicle Navigation," http://www.ucalgary.ca/engo_webdocs/YG/06.20246.Jau-Hsiung%20Wang.pdf, UCGE Reports, Department of Geomatics Engineering, University of Calgary, Sep. 2006.

Mirisola, L., Lobo, J. Dias, J., "Stereo Vision 3D Map Registration for Airships using Vision-Inertial Sensing," http://mail.isr.uc.pt/~mrl/admin/upload/1823822767172.pdf, The 12th IASTED Int. Conf. on Robotics and Applications, USA, Aug. 2006.

Karlsson, R., Tornqvist, D., Sjoberg, J., Hol, J., Hansson, A., "Positioning and Control of an Unmanned Aerial Vehicle," http://www.control.isy.liu.se/research/reports/2006/2736.pdf, Department of Electrical Engineering, Linkopings Universitet, Jun. 16, 2006.

Tibau, A., Privat, B., Voleau, G., Costela, F., Thaniotis, N., Rodriguez, J., "Nessie—An Autonomous Underwater Vehicle," http://www.dstl.gov.uk/news_events/competitions/sauce/06/journals/Nessie-Journal-paper.pdf? PHPSESSID=6ca3757558eb8fa96fc3aba0d46290a6, Heriot Watt University, 2006.

Albu, D., Birk, A., Chonnaparamutt, W., Dobrev, P., Giurgiu, A., Mihut, S-C., Minzu, B., Pascanu, R., Schwertfeger, A., Stan, A., Videv, S., "SAUC-E IUB Team", http://www.xsens.com/images/stories/PDF/Sauc-E%20IUB%20Team.pdf, International University Bremen, 2006.

Quigley, M., Vitus, M., "Machine Learning for Controlled Slides of a RC Car," http://www.stanford.edu/class/cs229/proj2005/QuigleyVitus-MachineLearningforControlledSlidesofaRCCar.pdf, CS229 Term Project, Dec. 16, 2005.

Noth, A., Engel, W., Siegwart, R., "Design of an Ultra-Lightweight Autonomous Solar Airplane for Continuous Flight," Autonomous Systems Lab, EPFL 2005.

Hobbs, S., "Mustang 0, A Low-cost technology demonstration nanosatellite Summary of the Group Design Project MSc in Astronautics and Space Engineering 2005/05," https://dspace.lib.cranfield.ac.uk/bitstream/1826/922/2/GDP2004.pdf, College of Aeronautics Report 0502, Cranfield University, Aug. 8, 2005.

Wang, J., Gao, Y., "Fuzzy Logic Expert Rule-based Multi-Sensor Data Fusion for Land Vehicle Attitude Estimation," http://www.codata.org/codata/04conf/papers/Wang-paper.pdf, Department of Geomatics Engineering, The University of Calgary, Canada, 2005.

Tao, Y., Hu, H., Zhou, H., "Integration of Vision and Inertial Sensors for Home-based Rehabilitation," InerVis 2005, the 2nd Workshop on Integration of Vision and Inertial Sensors, Apr. 18, 2005.

Batile, J., Ridao, P., Garcia, R., Carreras, M., Cufi, X., El-Fakdi, A., Ribas, D., Nicosevici, T., Batile, E., Oliver, G., Ortiz, A., Antich, J., "URIS: Underwater Robotic Intelligent System," Computer Vision and Robotics Group (University of Girona), Systems Robotics and Vision Group (University of the Balearic Islands), Spain, 2004 (Abstract).

Bouabdallah, S., Noth, A., Siegwart, R., "PID vs. LQ Control Techniques Applied to an Indoor Micro Quadrotor," Autonomous Systems Laboratory, Swiss Federal Institute of Technology, Lausanne, Switzerland, 2004.

Noth, A., "Synthèse et Implémentation d'un Contrôleur pour Micro-Hélicoptère à 4 Rotors," http://www.vuedehaut.fr/Quadri/rapportNoth.pdf, Microtechnique, Politecnico Federale Losanna—Swiss Federal Institute of Technology, Feb. 2004, translation of summary only.

Ridao, P., Batile, E., Ribas, D., Carreras, M., "Neptune: A HIL Simulator for Multiple UUVs," Institute of Informatics and Applications, University of Girona, Spain, 2004.

Ridac, P., Ribas, D., Batile, E., Hernandez, E., "Simulation of physical agents. An application to underwater robots," Campus De Montilivi CP: 17071-Griona (Spain) 2004. (Abstract).

Bouabdallah, S., Murrieri, P., Siegwart, R., "Design and Control of an Indoor Micro Quadrotor," Swiss Federal Institute of Technology (Switzerland), University of Pisa (Italy), 2003.

Delleman, N., den Dekker, E., Tan, T., "I3VR—intuitive interactive immersive virtual reality—technology," http://www.xsens.com/images/stories/PDF/I3VR-intuitive_interactive_immersive_virtual%20reality-technology.pdf, Presented at IEA 2006, TNO Human Factors & Paris Descartes University, UPRES Ergonomie, 2006.

(56) References Cited

OTHER PUBLICATIONS

Hub A., Hartter, T., Ertl., T., "Interactive Localization and Recognition of Objects for The Blind," http://www.visus.uni-stuttgart.de/uploads/tx_vispublications/csun06-hhe.pdf, Northridge Center on Disabilities' 21st Annual International Technology and Persons with Disabilities Conference, Los Angeles, CA 2006.

Calinon, S., Billard, A., "Recognition and Reproduction of Gestures using a Probabilistic Framework combining PCA, ICA and HMM," http://infoscience.epfl.ch/record/60067/files/icmlUS01.pdf?version=1, Autonomous Systems Lab, Ecole Polytechnique Fédérale de Lausanne (EPFL), CH-1015, Lausanne, Switzerland, 2005.

Wagner, Martin, "Tracking with Multiple Sensors," http://www1.in.tum.de/static/lehrstuhl/files/teaching/Doktorandenseminar/wagner2004doktSem_dissFinal.pdf, Institut für Informatik, Technische Universität München, Mar. 11, 2005.

Calinon, S., Guenter, F., Billard, A., "Goal-Directed Imitation in a Humanoid Robot," Proceedings of the 2005 IEEE. International Conference on Robotics and Automation, Barcelona, Spain, Apr. 2005.

Schon, T., Gustafsson, F., "Integrated Navigation of Cameras for Augmented Reality," Division of Automatic Control, Linköping University, Linköping, Sweden, 2005.

Schmalstieg, D., Reitmayr, G., "The World as a User Interface: Augmented Reality for Ubiquitous Computing," Central European Multimedia and Virtual Reality Conference (2005).

Wursthorn, S., Herin, A. Coelho, H., Staub, G., "Applications for Mixed Reality," http://www.cartesia.org/geodoc/isprs2004/comm3/papers/422.pdf, Institute for Photogrammetry and Remote Sensing University of Karlsruhe (TH), Karlsruhe, Germany, 2004.

Grinstead, B., Koschan, A., Abidi, M., "Developing detailed a priori 3D models of large environments to aid in robotic navigation tasks," Proc. SPIE Unmanned Ground Vehicle Technology VI, vol. 5422, Orlando, FL USA, pp. 561-568, Apr. 2004.

Calinon, S., Billard, A., "Stochastic Gesture Production and Recognition Model for a Humanoid Robot," Proceedings of 2004 IEEE/RSJ International Conference on Intelligent Robots and Systems, Sep. 28-Oct. 2, 2004, Sendai, Japan.

Leebmann, J., "An Augmented Reality System for Earthquake Disaster Response," http://www.isprs.org/proceedings/XXXV/congress/comm3/papers/399.pdf, TS ThS 19 Urban Modelling, Visualisation and Tracking, Institut für Photogrammetrie und Fernerkundung, Universitat Karlsruhe (TH), Karlsruhe, Germany, 2004.

Ribo, M., Brandner, M., Pinz, A., "A Flexible Software Architecture for Hybrid Tracking," 11th International Conference on Advanced Robotics, Coimbra, Portugal, Jun. 30-Jul. 3, 2003.

Degris, T., Lachéze, L., Boucheny, C., Arleo, A., "A Spiking Neuron Model of Head-direction Cells for Robot Orientation," LPPA College De France CNRS, Animatlab—LIP6, Paris, 2003.

Aron, M., Simon, G., Berger, M., Vigueras, F., "Hybrid tracking in multiplanar environments," http://www.loria.fr/~gsimon/ismar04/.

Siegl, H., Stock, C., Pinx, A., "Deliverable D.4.2 Design of a visual human-computer interface using AR features," Bielefeld University (BU(N)), Visual Active Memory Processes and Interactive Retrieval (Vampire), Jun. 4, 2003.

Siegl, H., Ganster, H., Pinx, A., "Mobile AR Setups," Proceedings of the 27th Workshop of the ÖAGM/AAPR, Laxenburg, 2003, pp. 245-252.

Krueger, A., Edelmann-Nusser, J., Spitzenpfeil, P., Huber, A., Waibel, K., Witte, K., "A Direct Measuring Method for the Determination of the Edging Angle and the Ground Reaction Force in Alpine Skiing," http://w4.ub.uni-konstanz.de/cpa/article/viewFile/197/157, Proceedings of the XXIV International Symposium on Biomechanics in Sports (vol. 1, S. 284-287), University of Salzburg, 2006.

Moore, S., MacDougall, H., Peters, B., Bloomberg, J., Curthoys, I., Cohen, H., "Modeling locomotor dysfunction following spaceflight with Galvanic vestibuiar stimulation," http://research.mssm.edu/moores01/publications/EBR%20GVS2.pdf, Springer-Verlag, Apr. 11, 2006.

MacDougall, H., Moore, S., Functional Assessment of Head-Eye Coordination During Vehicle Operation, http://www.psych.usyd.edu.au/staff/hamish/Publications/pubs%2008%20-%20Functional%20Assessment%20of%20Head-Eye%20Coordination%20During%20Vehicie%20Operation%20s.pdf, Optometry and Vision Science, vol. 82, No. 8, Aug. 2005, pp. 706-715.

Marentakis, G., Brewster, S., "Effects of reproduction equipment on interaction with a spatial audio interface," http://eprints.gla.ac.uk/3218/1/CHI2005_marentakis1.pdf, Department of Computing Science, University of Glasgow, Apr. 2005.

Huynh, T., Schiele, B., "Unsupervised Discovery of Structure in Activity Data using Multiple Eigenspaces," Computer Science Department TU Darmstadt, Germany, 2005.

Roetenberg, D., Baten, C., Veltink, P., "Estimating Body Segment Orientation by Applying Inertial and Magnetic Sensing Near Ferromagnetic Materials," http://doc.utwente.nl/61456/1/Roetenberg07estimating.pdf, IEEE Transactions on Neural Systems and Rehabilitation Engineering, vol. 15, No. 3, pp. 469-471, Sep. 2007.

Schepers, H., Koopman, H., Veltink, P., "Ambulatory Assessment of Ankle and Foot Dynamics," http://www.xsens.com/images/stories/PDF/Ambulatory%20Assessment%20of%20Ankle%20and%20Foot%20Dynamics.pdf, IEEE Transactions on Biomedical Engineering, vol. 54, No. 5, pp. 895-902, May 2007.

Roetenberg, D., Slycke, P., Veltink, P., "Ambulatory Position and Orientation Tracking Fusing Magnetic and Inertial Sensing," http://www.xsens.com/images/stories/PDF/Ambulatory%20Position%20and%20Orientation%20Tracking%20Fusing.pdf, IEEE Transactions on Biomedical Engineering, vol. 54, No. 5, pp. 883-890, May 2007.

Luinge, H., Veltink, P., Baten, C., "Ambulatory measurement of arm orientation," http://eprints.eemcs.utwente.nl/8580/01/Luinge_-_arm_orientation_-_J_Biomech_2007.pdf, Journal of Biomechanics 40, pp. 78-85, Jan. 2007.

Hol, J., Schon, t., Gustafsson, F., Slycke, P., "Sensor Fusion for Augmented Reality," The 9th International Conference on Information Fusion, Florence (Italy), Jul. 10-13, 2006.

Roetenberg, D., Luinge, H., Baten, C., Veltink, P., "Compensation of Magnetic Disturbances Improves Inertial and Magnetic Sensing of Human Body Segment Orientation," IEEE Transactions on Neural Systems and Rehabilitation Engineering, vol. 13, No. 3, Sep. 2005.

Luinge, H. Veltink, P., "Measuring orientation of human body segments using miniature gyroscopes and accelerometers," http://eprints.eemcs.utwente.nl/18451/01/J_Luinge_MBEC_43_273.pdf, Medical & Biological Engineering & Computing 2005, vol. 43, p. 273-282.

Roetenberg, D., Luinge, H., Veltink, P., "Inertial and magnetic sensing of human movement near ferromagnetic materials," Proceedings of the Second IEEE an ACM International Symposium on Mixed and Augmented Reality (ISMAR '03) 0-7695-2006-5/03, 2003.

Luinge, H., Veltink, P., "Inclination Measurement of Human Movement Using a 3-D Accelerometer With Autocalibration," http://doc.utwente.nl/47643/1/01273529.pdf, IEEE Transactions on Neural Systems and Rehabilitation Engineering, vol. 12, No. 1, Mar. 2004.

Veltink, P., Hermens, H., Baten, C., Slycke, P., Buma, D., Luinge, H., "Ambulatory Systems for Enhanced Human Motor Control," http://www.exsens.com/images/stories/PDF/WESIC_2001.pdf, 3rd Workshop on European Scientific and Industrial Collaboration (WESIC 2001) Session Bio-Mechatronics (Invited Session).

Veltink, P., Slycke, P., Morsink, E., Hemssems, J., Bultstra, G., Hermens, H., "Towards Automatic Optimization of Gait Supported by a Two Channel Implantable Drop Foot Stimulator," http://www.xsens.com/images/stories/PDF/Vienna_FES_2001.pdf, 7th Vienna International Workshop on Functional Electrical Stimulation.

Veltink, P., Luinge, H., Kooi, B., Baten, C., Slycke, P., Oltruis, W., Bergveld, P., "The artificial vestibular system—design of a tri-axial inertial sensor system and its application in the study of human movement," http://www.xsens.com/images/stories/PDF/ISPG2001.pdf, Symposium of the International Society for Postural and Gait Research (ISPG 2001) Session Perturbations of Gait and Posture.

(56) References Cited

OTHER PUBLICATIONS

Roetenberg, D., "inertial and Magnetic Sensing of Human Motion," http://doc.utwente.nl/06176/1/thesis_Roetenberg.pdf, PhD Thesis D. Roetenberg, May 2006, University of Twente.

Luinge, H., "Inertial Sensing of Human Movement," http://doc.utwente.nl/38637/1/t0000021.pdf, PhD Thesis H.J. Luinge, Dec. 2002, University of Twente.

Johnny Chung Lee—Projects-Wii, http://johnnylee.net/projects/wii/ (2008-2009).

"Head Tracking for Desktop VR Displays using the Wii Remote," http://youtu.be/Jd3-eiid-Uw (Dec. 21, 2007).

WiiDesktopVR, Software (2007).

WiiDesktopVR_v02, Software (2008).

* cited by examiner

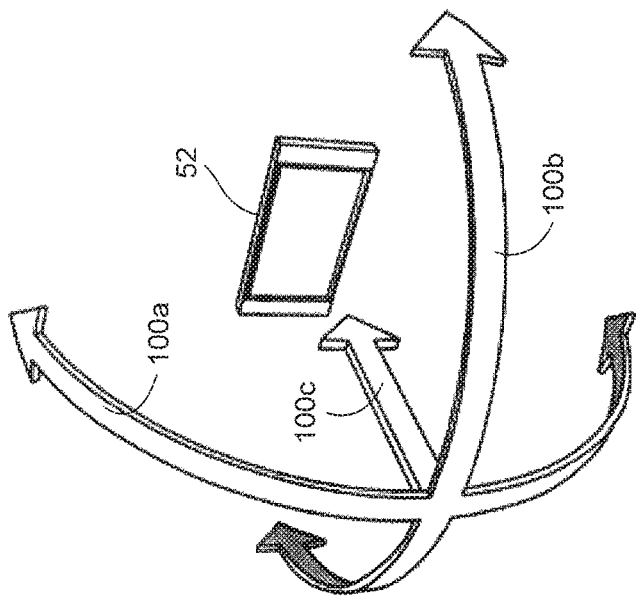
Fig. 2B Two Points
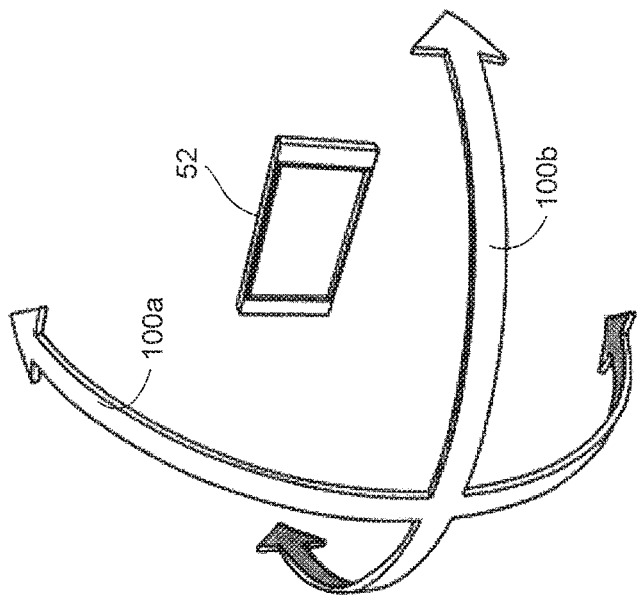
Fig. 2A Single Point

3/4

Front

Top

EYE TRACKING ENABLING 3D VIEWING

CROSS-REFERENCE TO RELATED APPLICATIONS

This is a continuation of U.S. patent application Ser. No. 14/794,335 filed Jul. 8, 2015, now U.S. Pat. No. 10,144,445; which is a continuation of U.S. patent application Ser. No. 14/197,831 filed Mar. 5, 2014, now U.S. Pat. No. 9,098,112 issued Aug. 4, 2015; which is a continuation of U.S. patent application Ser. No. 12/879,909 filed Sep. 10, 2010, now U.S. Pat. No. 8,704,879 issued Apr. 22, 2014; which claims the benefit of U.S. Provisional Application No. 61/378,921 filed Aug. 31, 2010. The disclosures of the prior applications are incorporated herein in their entirety by reference.

STATEMENT REGARDING FEDERALLY SPONSORED RESEARCH OR DEVELOPMENT

None.

FIELD

The technology herein relates to three-dimensional imaging, and more particularly to 3D viewing on conventional 2D displays such as televisions by tracking a person's viewpoint. The technology herein also relates to viewpoint movement detection providing collision related game logic benefits including for example allowing a player to dodge projectiles and/or a game character's ability to see the player when not behind line of sight obstacles.

BACKGROUND AND SUMMARY

Three-dimensional imaging has become extremely popular. For example, as more and more home viewing occurs on large-screen high resolution televisions and other display devices, movie theaters have sought to differentiate the movie theater experience from home viewing by offering three-dimensional films. As is well known, such technology works by encoding stereoscopic images in different colors, and using special 3D glasses with color filters to present different (offset) images to the left and right eyes. Such 3D films can create remarkable viewing experiences to theater goers willing to wear special 3D glasses. However, while it is also possible to provide the same 3D viewing experience on home televisions and other home display devices through use of specially-encoded images and 3D viewing glasses, such technology has not yet caught on at least in part because many viewers don't want to always wear 3D glasses to watch television in their living rooms and dens.

Other ways are known for providing 3D viewing experiences without the need for special 3D glasses but instead by using specialized 3D display devices. For example, specialized stereoscopic lenticular displays are known that present different images to the left and right eyes thereby creating a 3D imaging effect. While such viewing systems have benefits and advantages, the cost of specialized displays for large sized images such as in a living room may be prohibitive and the technology might not work especially well on large screens. Some segments of the gaming community have become used to playing certain kinds of games (e.g., action-adventure, sports, etc.) on large LCD, plasma or other high-definition display screens. While it may eventually be possible to deploy large display screens especially adapted for 3D viewing in a cost-effective manner, there will likely always be legacy 2D display screens for which it would be useful to provide a 3D display experience without use of special glasses or other special display technology.

Much work has been done in the past in connection with tracking a viewer's position or viewpoint, and generating a responsive 3D display. For example, it is common in virtual realty or other similar systems to provide a so-called "heads-up" display that is responsive to the position and orientation of a user's head. In some such systems, a user wears a special helmet containing inertia measurement electronics. The helmet senses the direction the user is looking as well as the orientation of the user's head. In response, a computer generates an interactive image that reflects the user's current viewpoint. Such images so generated can provide a high degree of realism and interesting three-dimensional imaging effects. It would be desirable to provide similar 3D imaging using a home television and other home electronics within cost, usability and other constraints present in the average home.

The exemplary illustrative non-limiting technology herein enables 3D viewing on conventional 2D displays such as home television sets by tracking a person's viewpoint. Detecting a player's viewpoint movement to change the viewing of the displayed object gives the illusion that the object is physically present in three-dimensional space. Viewpoint movement detection can provide collision-related game logic benefits such as allowing a player to dodge projectiles, giving a game character an ability to "see" the player when not behind line-of-sight obstacles, and other advantages.

Some exemplary illustrative non-limiting implementations enable physical presence on standard two-dimensional displays such as televisions through tracking a player's viewpoint using a relatively wide field of view (FOV) so that tracking does not stop prematurely when the player moves out of range Additionally, object placement is used to maximize parallax, which in turn enhances the effect(s) of physical presence.

In other illustrative non-limiting implementations, additional game play capabilities are enabled to e.g., moving the user's head and body to position the eye as a natural motion to seeing 3D objects. This allows participating game players to for example dodge game objects, and to permit virtual game characters to be "aware" of the human game player's location and/or presence.

In some illustrative non-limiting implementations, tracking a single point on or near the user is sufficient to enable such a dramatic effect. Tracking more points allows for additional capability, but even single point tracking provides significant and dramatic benefits.

Additional Example Non-Limiting Features and Advantages

Enable physical presence on standard 2 dimensional displays such as television through:
  Tracking player's viewpoint
  Wide FOV (tracking doesn't stop prematurely as compared to many or most prior solutions that have narrower angles <50 degrees FOV)
  Object placement to maximize parallax. Parallax enhances effect of physical presence.
  Enable additional game play capability
  Moving head+body to position the eye is a natural motion to see 3D objects
  Dodge game objects
  Game character is aware of player's location and presence
  Tracking Technology
  head/eye tracking and matching 3D space modeling between virtual reality and real word geometry provides 3D viewing even a single point is enough to enable this dramatic effect. More points allows for additional capability but single point benefit is the most significant and already dramatic.

Some Non-Limiting Tracking Options
Camera Based Tracking
   Marker on head, Camera on TV
   Visible light band camera
   Face Detection software determine location of the head and extrapolate the position of the eyes
   To improve detection, increase signal-to-noise ratio by wearing a marker
   IR camera
   Infrared spectrum enhanced detect by ignoring all visible spectrum image.
   Infrared emitter (IR LED) illuminate the scene with retroreflector markers.
   IR emitter can be worn directly as markers providing high signal/noise ratio.
   Wide Field Of View
   Enable larger viewpoint tracking range and result in freedom of user motion. Typical image camera is <50 degrees FOV. It is desirable to achieve 110 degree horizontal and 70 degree vertical field of view.
   Number of Markers
   1 point provides viewpoint movement along a spherical shell
   2 markers provides position in 3D space of the viewpoint assuming eye is looking at the screen.
   >=3 points provide position in 3D space of the viewpoint as well as eye viewing orientation.
   1 point provides the greatest physical presence as player normally moves head side to side to view an object or scene to understand the spatial structure.
   2 point adds the ability to move viewpoint closer or further from the display assuming the eye remain looking at the display (reasonable assumption)
   3 points provide viewpoint orientation. Game can become aware of player's viewing direction (e.g. other game characters might say "hey look at me")
   Wearable Mount
   Hat
   Headband
   Glasses
   Anything wearable on head or even other part of the body represents possible mounting opportunity
   Options
   Camera on head, marker on TV
   Multiple cameras to divide field of view
   Other Tracking Technologies
   Magnetic
   Ultrasonic
Example Usage
   Viewing:
   The illusion of physical presence
   Players natural movement as viewing input
   Dodging
Game Character Awareness
   E.g. Game character becoming aware when the player looks away
Physical Presence Visual Enhancement
   These techniques maximize the 3D object's physical presence illusion:
   View point change results in view frustum change
   Objects modeled in real world coordinates and placed near the physical TV screen
   Increase parallax—introduce near field and far field objects in view to maximize parallax motion
   Enhance movement by scaling and offsets of marked points or marker placement
   3D data can be modeled in real world space coordinates (e.g., a 3D character such as a football player can be 15" tall placed near the plane of the display)
   As user eye position moves, appropriately rotate and translate in 3D characters to match the proper viewing from new eye position

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 2A and 2B illustrate different example non-limiting tracking types;

DETAILED DESCRIPTION

Figure 1:
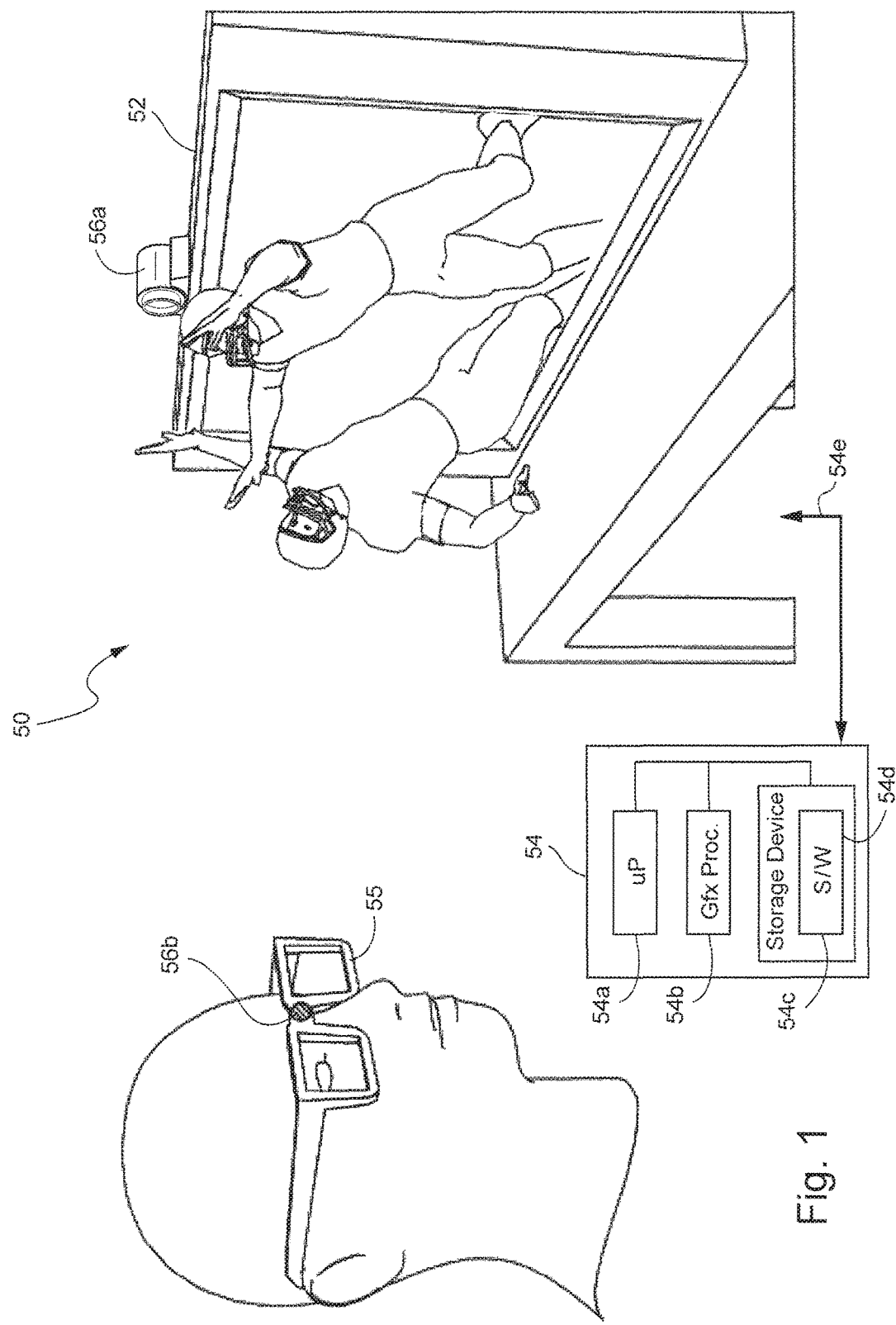
FIG. 1 schematically shows an example non-limiting graphics display system including user tracking.

FIG. 1 shows an example non-limiting 3D image display system 50 including a display device 52, an image generator 54, and a user tracking system 56a, 56b. User tracking system 56a, 56b determines the position of a person and/or the direction in which the person is looking, i.e. viewpoint. In response to the determined position and/or direction of the user's viewpoint, image generator 54 generates an image that appears three-dimensional to the person, i.e., the image appears to jump out of display 52 as if in three dimensions. As the user changes his viewpoint by turning his head and/or moving his head relative to display 52, image generator 54 adjusts the 3D perspective transformations applied to a 3D virtual world to generate new viewing perspectives that preserve and enhance the 3D effects.

In the example shown, image generator 54 can include any desired type of computing device such as for example a personal computer, video game console or handheld device, or any other suitable apparatus. In the example shown, image generator 54 includes a microprocessor 54a, a graphics processor 54b and a non-transitory storage device 54c. Storage device 54c in turn stores data and executable instructions 54d for execution by microprocessor 54 and/or graphics processor 54b. In one example non-limiting implementation, graphics processor 54b may comprise a conventional 3D graphics processor including for example the graphics capabilities of a Nintendo Wii, a Sony Playstation or Microsoft XBox video game console or any other desired graphics subsystem, graphics card or graphics pipeline.

In the example shown, image generator 54 produces an output 54e displayed by display device 52. In the example shown, display device 52 may comprise any conventional display device such as a television, an LCD or a plasma display panel, or any other suitable display device. Display 52 may for example comprise a conventional home television set that typically produces only 2D images.

It should be noted that in the context of the discussion herein, the term "3D image" does not mean merely an image that is generated based on a 3D virtual world. Rather, the image itself appears to be in three dimensions and as shown in FIG. 1, objects in the foreground appear to be projecting out of the plane of the 2D image device and into the actual three-dimensional world. Thus, the term "3D viewing" as used herein means "results in virtual objects appearing as if they occupy real world space." Such 3D viewing is generally not produced by conventional commercially available home video game systems at the time of this writing, but are instead typically available to the average consumer only through wearing 3D glasses at a movie theater, viewing a hologram, etc.

Thus, the technology provided by image generator 54 in conjunction with tracker 56a, 56b has the effect of transforming a conventional 2d display 52 into a 3D imaging system. The system 50 enables 3D viewing on a conventional 2D display 52 such as a television by tracking a person's viewpoint. Detecting a player's viewpoint movement to change the viewing of the displayed object(s) gives the illusion that the object is physically present in the 3D world as opposed to within or behind the screen of display 52. Properly matched geometry between virtual reality data and real world environment and proper movement according to a viewer's eye position/direction enables the brain to believe the object is floating in 3D space (stereo cues are unnecessary to provide this perception). The viewpoint movement detection provided by tracker 56a, 56b also provides enhanced features such as collision related game logic benefits including player dodging projectiles or other objects, a game character's ability to see the human player when not behind line of sight obstacles, etc.

System 50 thus enables physical presence on standard 2D displays such as a television viewer 52 by tracking the viewpoint of the human viewer or game player. In one exemplary illustrative non-limiting implementation, tracker 56a, 56b provides a relatively wide field of view (FOV) in excess of 50 degrees so that the human viewer can move anywhere within a range of 100 degrees or more and tracking will continue to be successful. In addition, the graphics applications software 54d provided by system 50 can provide virtual object placement in such a way as to maximize parallax to enhance the effect of the virtual object being physically present in the actual 3D world.

In addition, exemplary illustrative non-limiting implementations of system 50 enable additional game play capability. In particular, moving the head and body to position the eye is a natural motion to see 3d objects. This movement can be used to dodge game objects, provide virtual game characters that are aware of a player's location and presence, etc.

In one example non-limiting implementation, a single point is sufficient to enable this dramatic effect. See for example FIGS. 2A and 3A which show that tracking a single point on the user is sufficient to determine the angle from the user to the center of the screen. Thus, in the example shown in FIG. 1, tracker 56a, 56b may comprise an imaging device such as an IR camera 56a that tracks an IR marker or emitter 56b disposed on or worn by the user. FIGS. 2A, 3A show that tracking one point provides viewpoint movement along a spherical shell, and may also provide the greatest physical presence as the player normally moves his head side to side to view an object or scene to understand the spatial structure.

In other implementations, tracking more points allows for additional capabilities. For example, FIGS. 2B and 3B show additional capabilities (distance) obtained by tracking two points. Two markers for example can provide position in 3D space of the viewpoint assuming the eye is looking at the display 52. Two points add the ability to move the viewpoint closer to or further away from the display 52 assuming the eye remains looking at the display (which is typically a reasonable assumption).

Figure 3C:
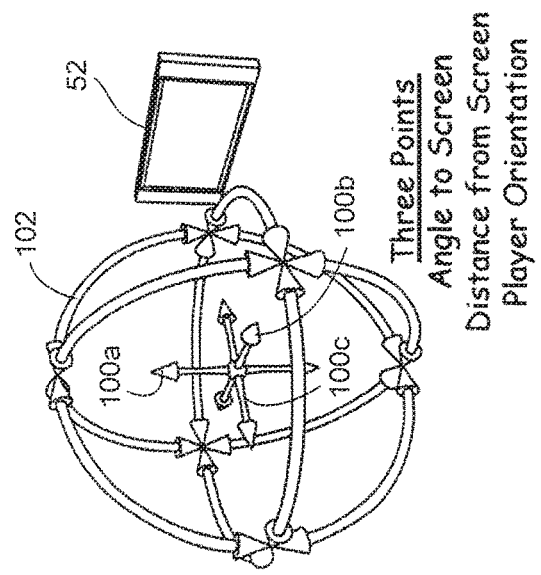
FIGS. 3A-3C further illustrate example non-limiting tracking types.
Figure 3B:
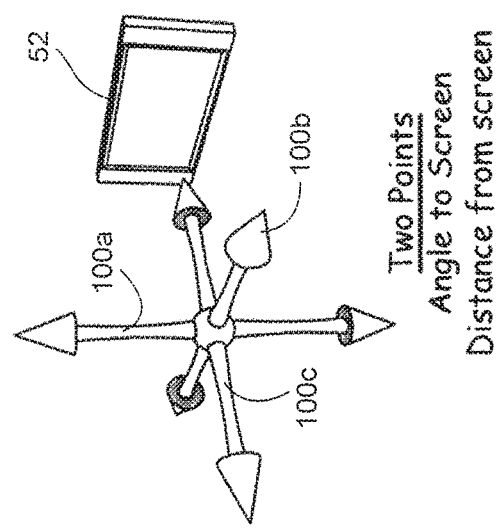
Figure 3A:
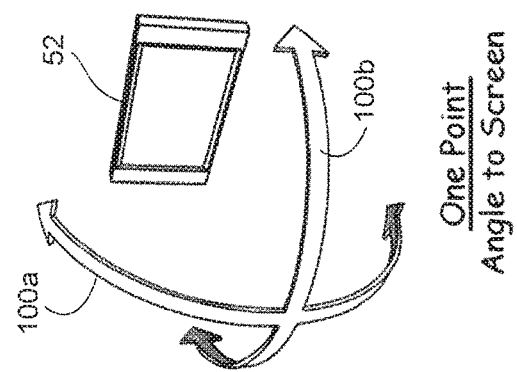

FIG. 3C shows still additional information (i.e., orientation) that can be obtained by tracking 3 points. Tracking three or more points provides position in 3D space of the viewpoint as well as eye viewing orientation. Three points thus provides viewer orientation that can be used for example to allow a game or other application to become aware of the player's viewing direction (e.g., to allow eye contact between a human player and a virtual player). The virtual character can for example detect when the human player is looking at him, and act accordingly.

While tracking additional points can have advantages, viewpoint determination based on tracking even a single point as shown in FIG. 1 is perhaps the most significant and can provide dramatic three-dimensional effects.

Figure 4A:
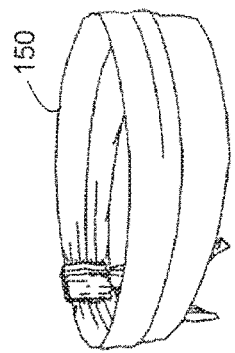
FIGS. 4A-4C illustrate example non-limiting headgear for tracking head position and movement.
Figure 4B:
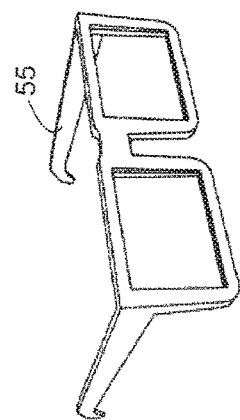
Figure 4C:
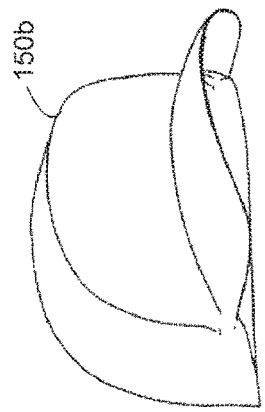

FIGS. 4A-4C show different non-limiting options for devices that can be worn on the head and can support a marker or emitter for tracking purposes. Such devices can include for example a hat, a headband, glasses, or anything that is wearable or supportable on the head or other part of the body to provide possible mounting opportunities. For camera based tracking, it is possible for example to wear a marker 56b on the head and provide a camera 56a in a stationary position such as on the display 52. A visible band light camera can be used in conjunction with face detection software to determine the location of the head and to extrapolate the position of the eyes. To improve detection, it is possible to decrease the signal-to-noise ratio by wearing a marker. In the case of an IR camera, the infrared spectrum detection can be enhanced by ignoring all visible spectrum. Infrared (IR) emitters such as IR LEDs can be used to illuminate a scene with retroreflector markers. An IR emitter can be worn directly as markers providing high signal-to-noise ratio. Other arrangements can include a camera on the player's head and a marker on the display 52 or other fixed location in the room, or multiple cameras or other imaging devices to divide the field of view. Ultrasonic, magnetic, electromagnetic or any other suitable tracking technology can be used.

Figure 5A:
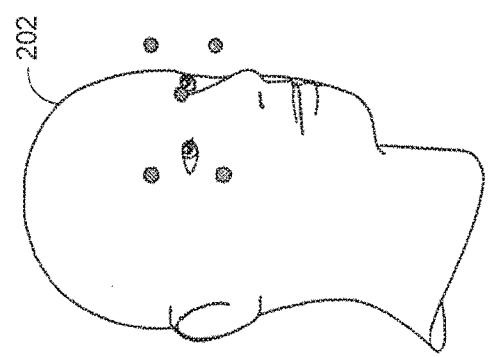
FIGS. 5A-5C show example viewing frustum in front of a subject's eyes for different viewing directions.
Figure 5B:
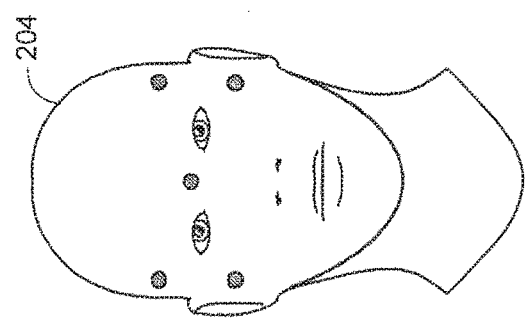
Figure 5C:
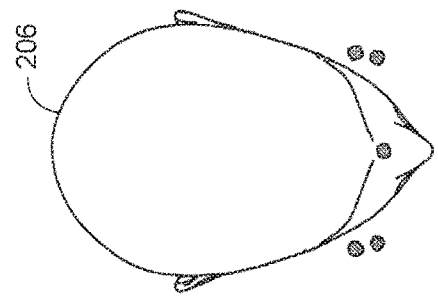

In one example illustrative non-limiting implementation, it is possible to provide a wide field of view by enabling a larger viewpoint tracking range and providing a resulting increased freedom of user motion. Typical image cameras provide 50 degrees of field of view. It is desirable to achieve 110 degrees horizontal and 70 degree vertical field of view (see FIGS. 5A-5C—which show different potential marker positions).

Figure 6A:
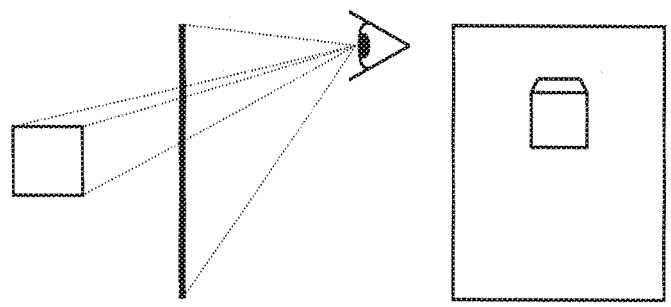
FIGS. 6A-6C show example graphics perspectives.
Figure 6B:
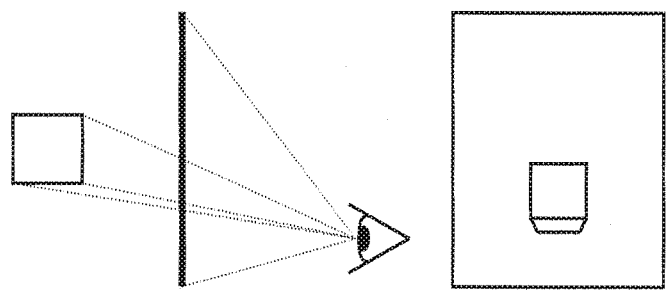
Figure 6C:
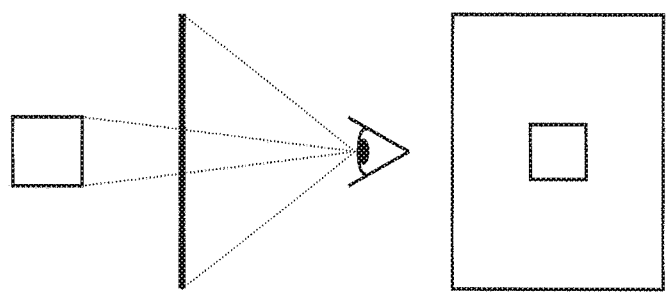

FIGS. 6A-6C illustrate how image generator 54 can alter the perspective of a rendered image based on viewpoint. For example, FIG. 6A shows that a cube viewed from an angle above will reveal the front face of the cube plus a foreshortened perspective view of the top face; FIG. 6B shows that viewing the same cube from below reveals the front face plus a foreshortened perspective view of the bottom face;

and FIG. 6C shows that viewing the cube head-on reveals the front face with no view of the top or bottom faces. Similar views can be generated for changes in viewpoint in the horizontal direction. Image generator 54 can automatically generate such images using conventional projection transformations as is well known to those skilled in the art. Generating images in real time response to information from tracker 56a, 56b can create an interesting dynamic three-dimensional effect.

Figure 7A:
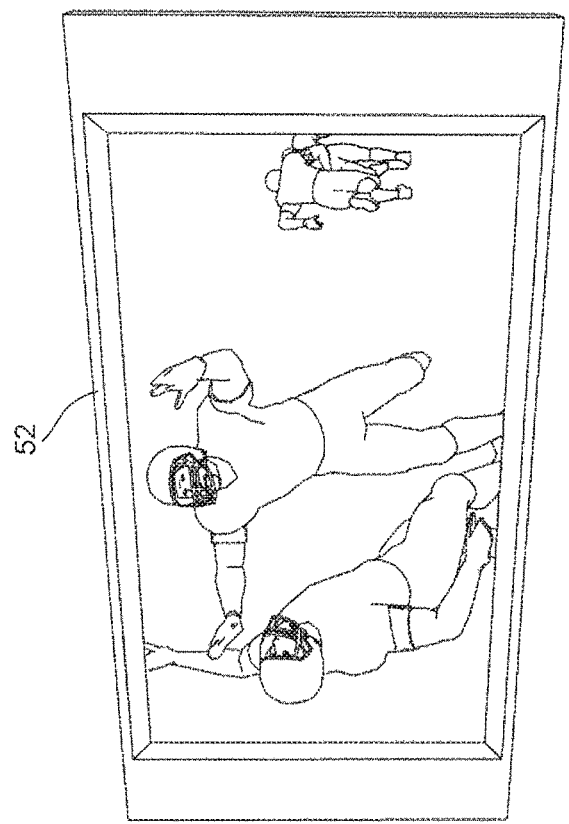
FIGS. 7A-7B show example images without 3-D enhancement but with parallax effects.
Figure 7B:
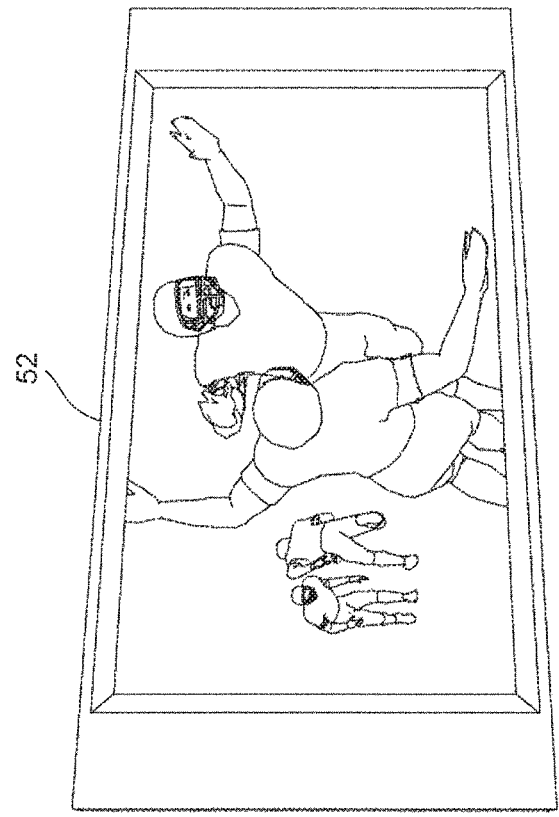
Figure 8C:
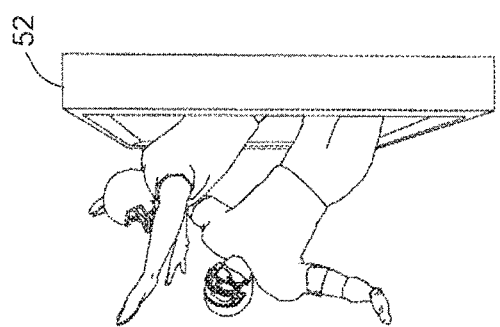
FIGS. 8A-8C show example images with 3-D enhancement.
Figure 8B:
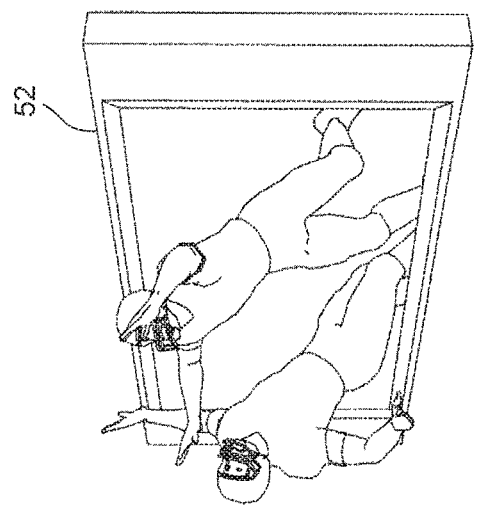
Figure 8A:
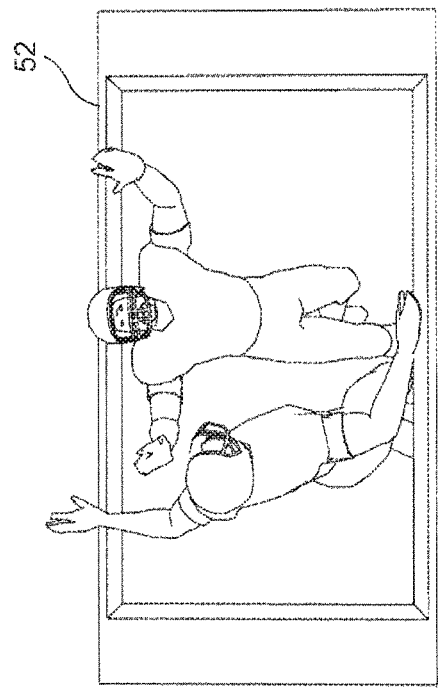

FIG. 7A, 7B show conventional images from different viewpoints when watching a conventional 2D image generator but providing different parallax distortion to create 3D effects. As explained above, parallax can be used to enhance the 3D viewing herein. FIGS. 8A-8C show 3D imaging effects from different viewpoints.

Figure 9:
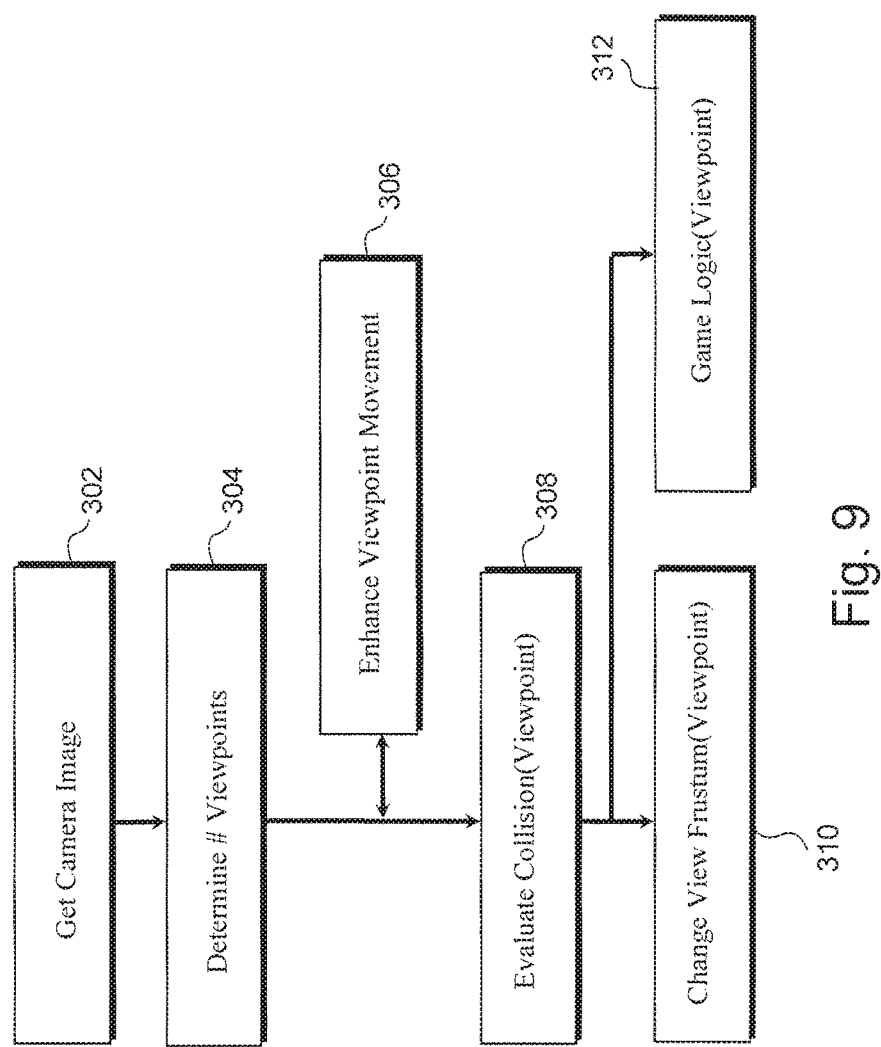
FIG. 9 shows an example non-limiting software processing algorithm.
Figure 10A:
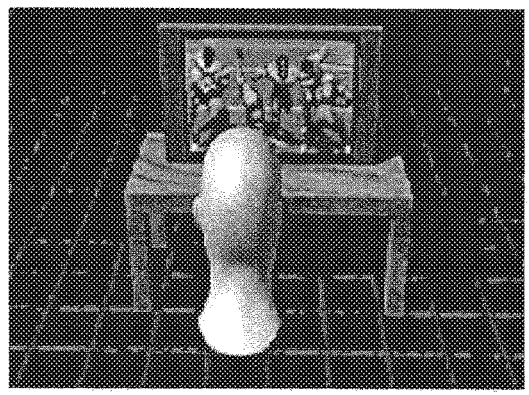
FIGS. 10A-10K show example third person images based on different head positions.
Figure 10B:
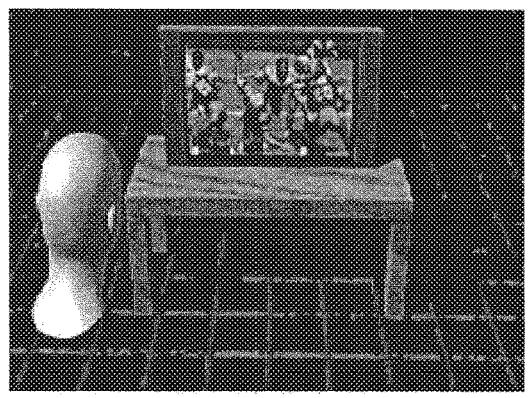
Figure 10C:
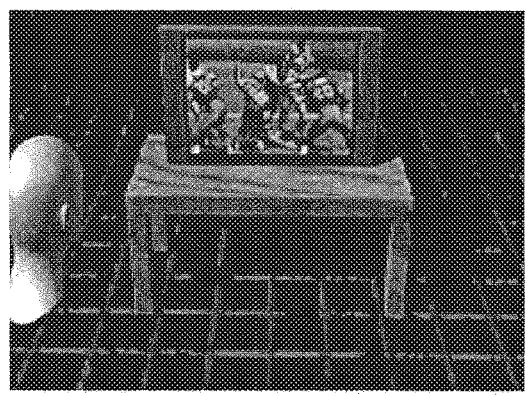
Figure 10D:
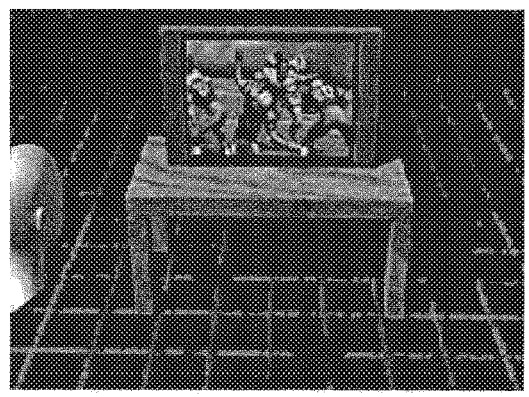
Figure 10E:
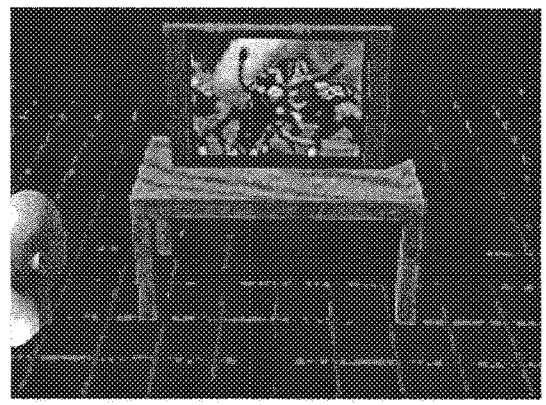
Figure 10F:
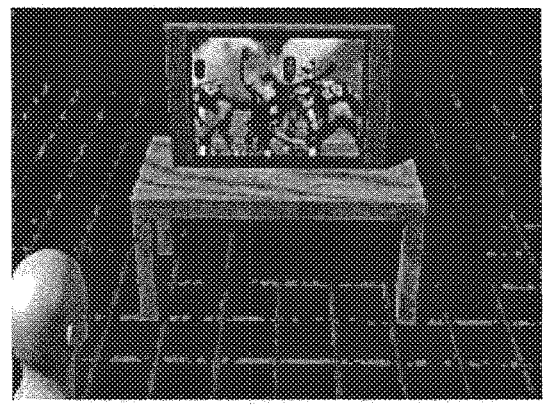
Figure 10G:
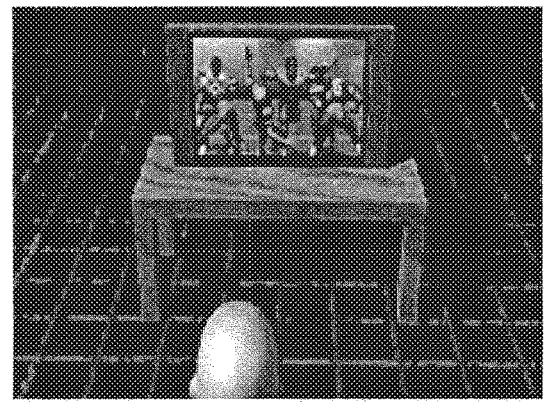
Figure 10H:
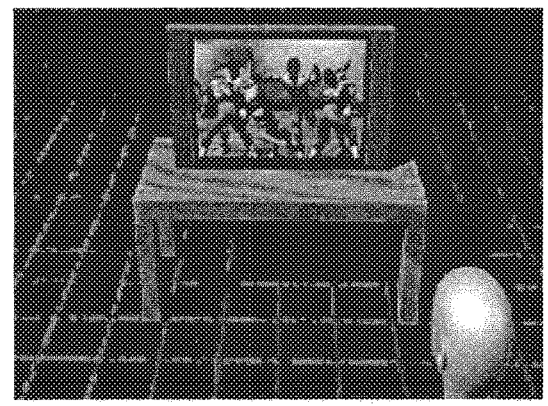
Figure 10I:
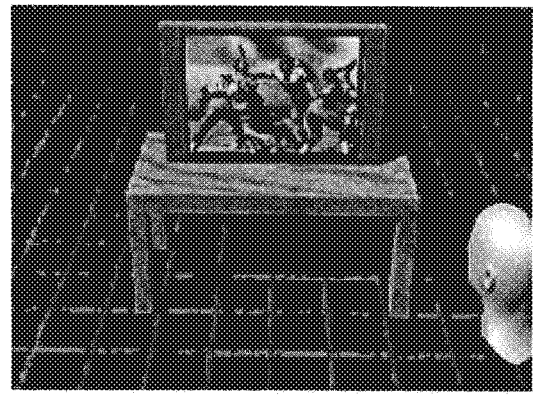
Figure 10J:
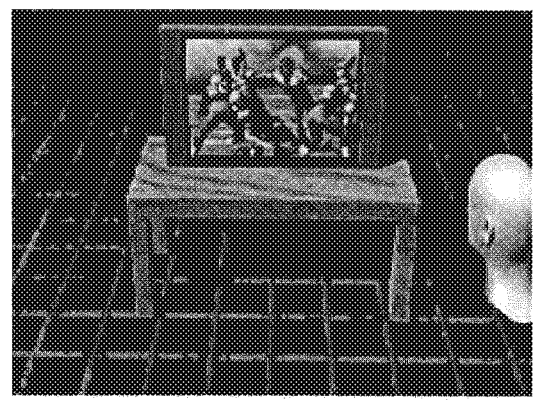
Figure 10K:
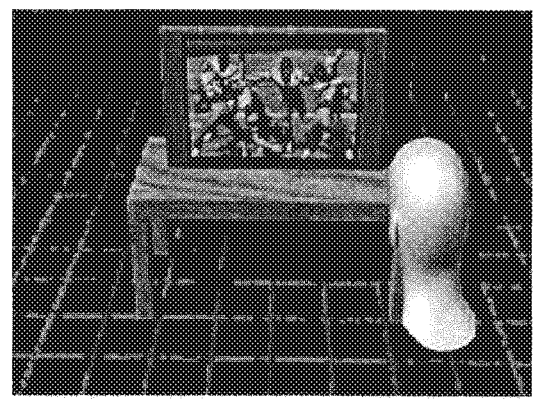
Figure 11A:
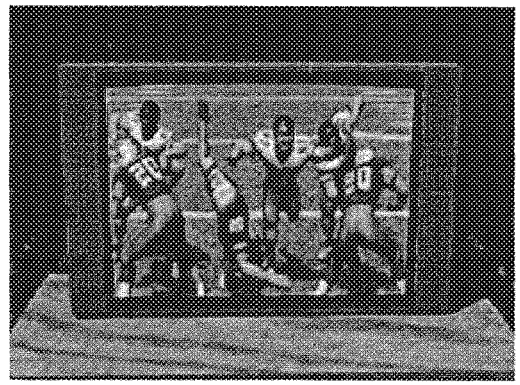
FIGS. 11A-11H show additional first person example non-limiting 3-D enhanced images.
Figure 11B:
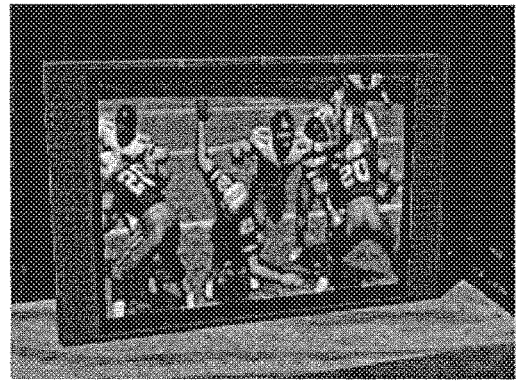
Figure 11C:
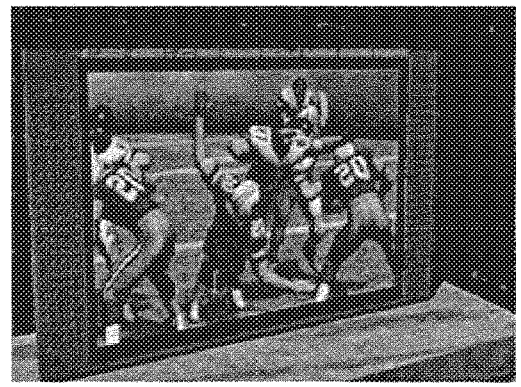
Figure 11D:
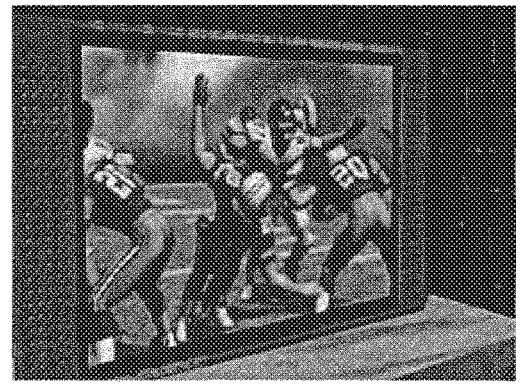
Figure 11E:
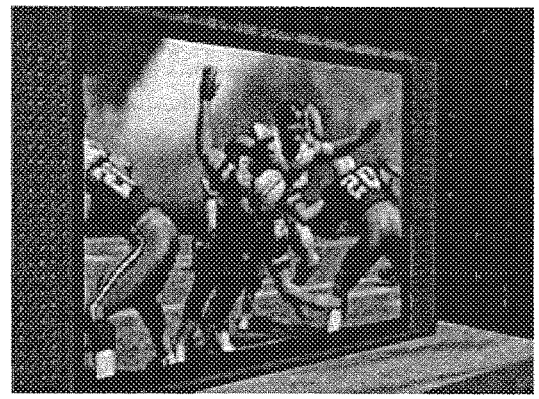
Figure 11F:
Figure 11G:
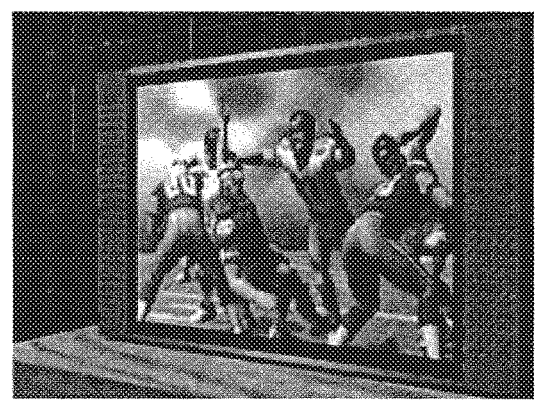
Figure 11H:

FIG. 9 shows example software processing for the FIG. 1 system. In the example shown, block 302 obtains the camera image from tracker 56a. The processor 54a executing instructions 54d from non-transitory storage device 54c determines the number of viewpoints (block 304) and then performs an enhanced viewpoint movement operation (block 306). The EnhanceViewpointMovement can optically increase the scale or offset of the actual player's movement to enhance the physical presence illusion. Data can be provided in polar coordinates to provide easy conversion to Cartesian coordinate space.

In one example implementation, an EvaluateCollision function (block 308) keeps the viewpoint from entering inside of objects. ChangeViewFrustum (block 310) changes the viewing frustum on the display to reflect to viewpoint movement. In one example non-limiting implementation, viewpoint changes result in view frustum changes, and objects having 3D data modeled in real world coordinates are placed near the physical television screen so they can be imaged in a way that appears to jump out of the screen. Head (eye position and direction) tracking provides input to change 3D data display according to viewpoint. One determination can be to process camera images to find the "center" position of the IR emitter. Increased parallax can be used to introduce near field and far field objects in view to maximize parallax motion. Tracking movement is enhanced by scaling and offsets of marked points or marker placement.

Meanwhile, game logic (block 312) is used to animate the displayed objects to provide full realistic motion of objects that appear to jump out of the display screen 52.

FIGS. 10A-10K show example 3D effects (third person view) along with the position of the viewer's head changing relative to the display 52. FIGS. 11A-11H show example first person views of different 3D images as viewpoint changes. FIGS. 11A-11H are taken from a movie that shows remarkable 3D viewing effects as the viewpoint changes. The 3D viewing effects may be hard to see in these patent drawings, but they are easy to discern in the actual viewing experience. For example, FIG. 11A (straight on) appears relatively 2D as might be expected, but changing the viewpoint to the left to result in the FIG. 11B, 11C, 11D drawings causes 3D viewing effects to become clear and distinct. Animation of such figures to provide motion (as opposed to still or stop action) makes the 3D viewing effects become very clear and remarkable. For this reason, a particularly useful feature of the technology herein is in connection with video games or other simulations that provide rapidly changing images. As the viewpoint changes, the system 50 re-renders the scene in real time from the new viewpoint to provide highly realistic 3D viewing. It appears that the football players are popping out of the display and occupy the real world. The effect is especially pronounced for objects in the foreground. For example, the arms and helmet of the player who is falling in FIGS. 11B-11D appears to be falling out of the television set and into the real world. Similarly, tackler 87 appears to be lunging out of the television set and into the real world. FIGS. 11A-11H show images generated with a still or static scene that is re-rendered at a relatively rapid rate (e.g., 30 or 60 frames per second) for a new perspective based on changing viewpoint. However, the scene could of course be animated and changing in real time based on game play or simulation for example, and at the same time the scene can be re-rendered from different viewpoints in real time based on changing tracking information. The overall effect provides highly interesting and exciting 3D imaging that maintains the user's interest.

In some implementations, the tracking information is not captured in real time but rather is stored and played back (or simulated) to provide a simulated change in viewpoint. Thus, the 3D viewing effects are discernable not just by the person whose viewpoint is being tracked, but others who are also watching (see FIG. 10A et seq.). Of course, if the 3D image changes its perspective in real time response to a particular user's change of viewpoint, the result to that user can approach virtual reality.

Dodging is possible by for example imaging 3D projectiles that fly toward the user. Using the 3D viewing effects described herein, the projectiles can appear to be flying out of the display toward the user. If the projectiles respond in real time to change in user viewpoint and/or position, the user can feel as if she is avoiding or dodging the projectiles. In one example non-limiting scenario, the projectiles preferably are imaged so that they appear to be elongated by the speed at which they are travelling, thereby providing a 3D effect as they appear to "pass" the user.

Further example enhancements:

Augmented Reality. Some synthetic picture intermixed with the real world can be used. This is a quick and realistic possibility to e.g., project certain types of images such as robots or to play a chess game. If we can locate in the real world where a planar surface is, we could each look through this object and see the same virtual object augmented into the real world. A display that is 50% real world, 50% synthetic, with positioning techniques and way to possibly detect motion or position is possible.

It is possible to use goggles to accommodate eye glasses. If used, then it is possible to handle see-through. An alternative is to capture the real world with a camera. Resolution is less, but we get the benefit of providing a hyper stereo view and enhancement of real world view.

It is possible to Invite your Curiosity by displaying the "inside" image on a screen that everyone could see. One way: cupped mirror could be half-reflective, one-way so observers can see an image of what the user is seeing. This gets a larger group involvement. Another way is to provide multiple head sets.

Enhancing the VR Experience Additional output devices that enhance the experience can be provided. For example, we can put light out that is correlated to the image to provide "ultra wide field of view correlated lighting." Given that your eye does not see clearly in the periphery, this could still be useful and interesting.

Additionally, smell is a very strong sense. There may be some ways to produce aromas for a very strong experience.

Virtual wind could enhance the experience.

Temperature: blowing cool air on your face.

Physiologically comfortable stereo viewing is a way to prevent headaches. If you find a little spec on your windshield, focus on that and then far field and then back again. Eye strain happens quite quickly. Lots of folks in the past require the users to focus far field and close up, but this can cause headaches. We can stay on one side of the focal point cone, to provide higher level of comfort.

Detect Emotions via monitoring mental state. Brain wave detection, detect eye movement, heart rate monitor or the like can be used. If we provide goggles, we can also provide detectors (electrodes) fairly easily.

Shroud Possible to filtering out the real world by using a shroud

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A system for generating 3D images comprising:
at least one sensor configured to track a direction in which a user is looking;
a graphics engine operatively coupled to the at least one sensor, the graphics engine rendering 3D graphical images in real time response to the direction the at least one sensor senses;
the graphics engine modeling objects in real world coordinates and introducing parallax distortion to near field and far field objects to increase perception of parallax motion.

2. The system of claim 1 wherein said sensor tracks the user's head orientation.

3. The system of claim 1 wherein the introduced parallax enhances the 3D viewing a displayed image plane.

4. The system of claim 1 wherein the graphics engine animates motion of said objects.

5. The system of claim 1 wherein said graphics engine images said object as part of an animated interactive display.

6. The system of claim 1 wherein said objects include a projectile the user is to dodge in the real world.

7. The system of claim 1 wherein said sensor tracks plural points on the user.

8. The system of claim 7 wherein said sensor tracks at least three points on the user.

9. The system of claim 1 wherein said sensor comprises an infrared sensor.

10. The system of claim 1 wherein the graphics engine performs 3D collision detection for portions of said objects that appear to extend beyond a viewing screen into the real world.

11. The system of claim 1 wherein said graphics engine changes the viewing frustrum in response to said sensor.

12. A system for providing 3D viewing comprising:
a tracking device that tracks a user's eyes; and
at least one processor coupled to said tracking device, said processor structured to project of at least one virtual object onto an image plane in response to the tracking device, and to use parallax responsive to the tracking device to generate a sequence of images that cause the virtual object to appear to extend beyond the image plane into the real world.

13. The system of claim 12 wherein said tracking device tracks the user's head through use of a marker.

14. The system of claim 12 wherein said processor introduces parallax to enhance parallax motion.

15. The system of claim 12 wherein said processor animates motion of said virtual object.

16. The system of claim 12 wherein said processor is adapted to cause display of said virtual object as part of an animated interactive application.

17. The system of claim 12 wherein said virtual object comprises a projectile that the user is to dodge in the real world.

18. The system of claim 12 wherein said tracking device comprises an infrared sensor.

19. The system of claim 12 wherein said processor is structured to perform 3D collision detection for portions of said virtual object that appear to extend into the real world.

20. The system of claim 12 wherein said processor is structured to change the viewing frustrum in response to said tracking device.

* * * * *